United States Patent [19]

Coote et al.

[11] 4,351,608

[45] Sep. 28, 1982

[54] FILTER HEAD

[75] Inventors: Jack H. Coote, Rochford; Arthur P. Jenkins, London, both of England

[73] Assignee: Ciba-Geigy AG, Basel, Switzerland

[21] Appl. No.: 49,681

[22] Filed: Nov. 13, 1979

[51] Int. Cl.³ .................... G03B 27/72; G03B 27/76
[52] U.S. Cl. ........................................ 355/35; 355/71
[58] Field of Search ................ 355/71, 35, 32; 350/311; 362/16, 17

[56] References Cited

U.S. PATENT DOCUMENTS

| | | | |
|---|---|---|---|
| 2,734,435 | 2/1956 | Leonardi | 355/71 X |
| 3,374,706 | 3/1968 | Weisglass | 355/71 X |
| 3,469,914 | 9/1969 | Thomson | 355/32 |

FOREIGN PATENT DOCUMENTS

| | | |
|---|---|---|
| 1077965 | 3/1960 | Fed. Rep. of Germany . |
| 1218017 | 1/1971 | United Kingdom . |
| 1223478 | 2/1971 | United Kingdom . |

Primary Examiner—Richard A. Wintercorn
Attorney, Agent, or Firm—Harry Falber

[57] ABSTRACT

A lamphouse for use with an enlarger head in the production of prints on variable contrast or on conventional photographic material which consists in part of a light source from which light is directed to a fixed apertured plate. There is on one side of the apertured plate remote from the light source a composite filter, one portion of which passes light in one of two mutually exclusive wavebands and the other passes light in the other of the two mutually exclusive wavebands. The composite filter is moveably mounted in relation to the apertured plate so that in one position the light passing the filter is in all of one of the mutually exclusive wavebands and in the second position the light passing the filter is in all of the other of the mutually exclusive wavebands. In intermediate positions of the filter a varying mixture of light of the two wavebands is transmitted. Mounted with the composite filter is a light attenuating means to cut down the amount of light passed in one of the wavebands to that which the combination of light source and photosensitive material to be exposed is more sensitive so that prints of equal visual density are obtained by exposures of equal duration whatever the position of the composite filter is relative to the apertured plate. The light attenuating means may be for example a shaped mask or a neutral density filter.

14 Claims, 9 Drawing Figures

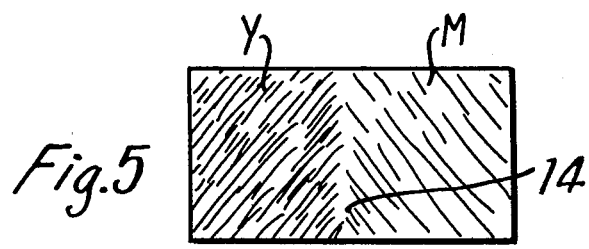
Fig.5
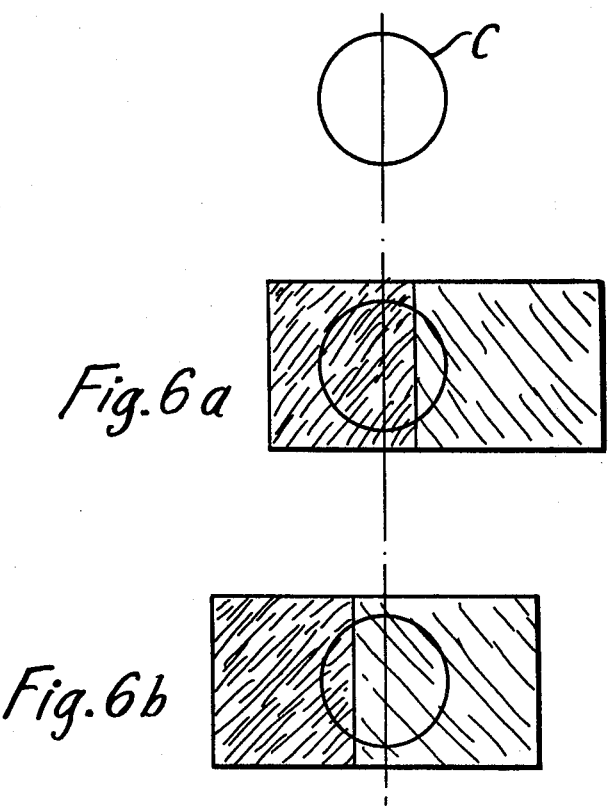
Fig.6a
Fig.6b

FILTER HEAD

This invention relates particularly to the production of prints on variable-contrast photographic printing material, usually printing paper.

Variable-contrast printing papers have been known for many years and are based on the use of photographic emulsion, or a combination or mixture of emulsions, which react differently to coloured printing light in the sense of yielding from a standard negative original prints of varying contrast according to the colour of the printing light used.

Thus for example as described in British Pat. No. 494,088, one such material comprises two gelatino silver halide emulsions, one of which is designed to afford images of high contrast while the other is designed to afford images of low contrast. The emulsions are arranged to be sensitive to light in different regions of the spectrum, for example the low-contrast emulsion may be blue-sensitive and the hight-contrast emulsion may be sensitised to the green and/or red regions of the spectrum. It then arises that accordingly as the colour of the exposing light varies, more of one and less of the other emulsion will be effectively exposed and the net contrast of the developed prints will correspondingly vary.

In other material as described in British Pat. No. 547,883 all the emulsion components are of the same basic contrast but the individual components have been dye-sensitised in varying degree to green light. Such material which at the present moment is of most interest may also be used as variable contrast photographic printing paper.

The usual technique employed in the production of prints on such materials is to provide a set of colour filters of different colour transmission characteristics, whereby the colour of printing light may be adjusted.

By the appropriate selection of the filter used to control the colour of the printing light, it then arises that negatives representing a wide range of contrasts can be printed on the one type of printing paper, each yielding a print of the desired contrast characteristics.

However the system as operated at present suffers from some disadvantages. Thus, when it is desired to make a change in the effective contrast of the paper by changing filters it also becomes necessary to modify the exposure given to the print. Since the required change in exposure varies with the degree of alteration that is being made in the contrast of a print, it is often necessary to expose several test strips before the final print can be made with assurance of a satisfactory result. Further, for convenience in operation, the contrast changing filters are often placed in the printing beam below the enlarger lens, thereby impairing to some extent the quality of the projected image. An alternative position for the filters is above the condenser, in the enlarger head, but this gives rise to considerable inconvenience in practice because of the large filter area required and also a range of colour densities are needed.

A photographic system which may also be used to produce prints of variable contrast consists of conventional photographic printing material of fixed contrast, preferably medium contrast, and a transparency, the image of which comprises a dye the optical absorption of which is selective within the wavelength band to which the printing material is sensitive. Thus, for example, the transparency may comprise an image in varying densities of a yellow dye which absorbs violet light heavily, but transmits green light relatively freely. If a print be made from such a transparency using only violet light, a print of high contrast will be produced. If the print be made using blue light, a print of lower contrast will result. Intermediate contrasts will result from the use of appropriate mixtures of violet and blue light.

It is the object of the present invention to provide a lamphouse for use with an enlarger head for printing on to variable contrast paper using a black and white transparency or on to conventional photographic print material using a monochrome transparency by use of which the optimum time remains unchanged throughout the whole of the available contrast range of the print material.

According to the present invention there is provided a lamphouse for use with an enlarger head in the production of prints on variable contrast material or on conventional photographic material in combination with a monochrome negative which comprises a light source from which light is directed to a fixed aperture plate, there being present a composite filter one portion of which passes light in one of two mutually exclusive wavebands and the other portion of which passes light in the other of the two mutually exclusive wavebands, the said composite filter being movably mounted in relation to the said apertured plate so that in one position the light passing the filter is predominantly in one of the said wavebands, and in a second position the light passing the filter is predominantly in the other of the said wavebands, whilst in intermediate positions a varying mixture of light in the two said wavebands is passed, there being present light attenuating means to cut down the amount of light passed in one of the said two mutually exclusive wavebands to which the combination of light source and photo-sensitive material to be exposed is more sensitive so that prints of equal visual density are obtained by exposures of an equal duration whatever the position of the said composite filter in relation to the apertured plate.

Thus by use of the lamphouse of the present invention alteration of the position of the composite filter in relation to the apertured plate alters the contrast of the exposed and processed print but it does not alter the visual density of the print. Thus once the optimum time of printing has been determined prints of different contrast but of the same visual density may be obtained merely by altering the position of the composite filter in relation to the apertured plate.

In one embodiment of the present invention the means to cut down the amount of light passed in one of the two mutually exclusive wavebands to which the combination of light source and photosensitive material to be exposed is more sensitive is a shaped mask.

In another embodiment of the present invention the means to cut down the amount of light passed in one of the two mutually exclusive wavebands to which the combination of light source and photosensitive material to be exposed is more sensitive is a neutral density filter mounted with the one portion of the composite filter which transmits light of the waveband which is required to be attenuated.

In some cases it is preferred to use both a shaped mask and a neutral density filter.

Particularly suitable neutral density filters are fine metal screens or light neutral metal deposited on that portion of the composite filter requiring light attenuation.

If the apparatus is to be used for printing onto variable-contrast material sensitive to blue and to green light, one portion of the composite filter used passes blue light but not green light and the other portion of the composite filter passes green light but not blue light.

Although such variable-contrast paper is not generally sensitive to red light, it is an advantage to arrange for the lamphouse to provide red light simultaneously with the blue and/or green light. In this way the visibility of the image on the enlarger easel is enhanced and composition and focussing of the picture are facilitated. In practice the preferred composite filter for use with variable-contrast material is therefore a composite filter one portion of which is yellow (minus blue) and the other portion of which is magenta (minus green).

The time required to expose correctly the photosensitive material to light passing a filter depends on the colour of light emitted by the light source, on the colour sensitivity of the photosensitive material and on the optical density of the filter. In one specific embodiment of the present invention a composite filter is used one portion of which is yellow and the other portion of which is magenta. There is mounted with this composite filter a mask so shaped that in one exposure position of the filter before the apertured plate the full amount of magenta (red and blue) light passes through the aperture, whilst in another position of the filter before the apertured plate a restricted amount of yellow (green and red) light passes through the aperture. At intermediate positions of the filter different proportions of yellow and magenta light pass through the apertured plate but in all of these positions the amount of yellow light is restricted compared with the amount which would be passed if no mask were present, whilst the amount of magenta light passed is substantially the same as if no mask were present. Such a composite filter and mask is illustrated in the accompanying drawings.

In another specific embodiment an elongated composite filter is used which is divided into five sections which correspond to five contrast grades, thus position 1 (which corresponds to grade 0) is all yellow whilst position 5 (which corresponds to grade 4) is all magenta, the three intermediate positions having varying amounts of yellow and magenta to enable the intermediate contrast grades 1, 2 and 3 to be obtained. There is mounted with this filter a mask which masks a portion of the yellow section of sections 1 to 4 of the composite filter. Such a composite filter and mask is also illustrated in the accompanying drawings.

In a further specific embodiment of the present invention a composite filter is used one portion of which is yellow and the other portion of which is magenta. There is mounted with the yellow portion of the filter a stainless steel grid which reduces the amount of light passed by the yellow portion of the filter to ¼. The stainless steel grid used is a woven wire cloth of nominal 100 mesh standard wire gauge having a wire diameter of 0.1321 mm. The approximate open area is 23%. The composite filter is mounted so that in one exposure position before the apertured plate the full amount of magenta (red and blue) light passes through the aperture, whilst in another position of the filter before the apertured plate all yellow light (green and red) passes through the aperture, the yellow light having been attenuated by the stainless steel grid mounted therewith. At intermediate positions of the composite filter different proportions of yellow and magenta light pass through the apertured plate. Such a composite filter is illustrated in the accompanying drawings.

Alternatively, the transmission of the yellow sector of the composite filter can be reduced to any desired extent by the deposition of suitable neutrally absorbing interference layers such as evaporated metal layers. The interference layers required to allow the transmission of red and green light and ensure the absorption of blue light can be located on one surface of the filter glass while the other face of the glass can carry the neutrally absorbing interference layers.

Instead of using a neutral density filter to reduce the amount of light transmitted in one of the two mutually exclusive wavebands a filter can be used which has some absorption in the band of electromagnetic radiation which it should transmit. For example when a yellow filter is required it may have significant green and red light absorption. Such a filter is hereinafter referred to as a dirty filter.

It is to be understood that the term light as used in the specification includes all electromagnetic radiation to which photographic silver halide material is sensitive or to which it can be sensitised. For all practical purposes this means ultraviolet light from about 200 nm, all visible light and infra-red light up to about 850 nm.

Photographic systems based on the use of ultraviolet light as one of the light sources are known and one such system is described in German Pat. No. 1,161,123.

Preferably a dichroic composite filter is used because dichroic filters are able to withstand better the heat generated by a tungsten filament lamp.

The composite filter used may be two pieces of glass joined, but most preferably it comprises a single piece of glass one end of which carries an evaporated layer which comprises an interference filter which passes light in one mutually exclusive waveband and the other end of which carries an evaporated layer which comprises an interference filter which passes light in the other mutually exclusive waveband.

Preferably the composite filter is so mounted in relation to the apertured plate that a manual control alters the position of the composite filter to enable a preset contrast grade to be obtained. Thus in most variable-contrast material an all green light exposure produces a very low contrast or soft print whilst an all blue light produces a very high contrast or hard print. Thus all green light corresponds to a contrast of 0 in most contrast grading systems whilst all blue light corresponds to a contrast grade of 4. Intermediate contrast grades are obtained by mixtures of green and blue light, grade 3 comprising more green than blue light, whilst grade 1 comprises more blue than green light.

The accompanying drawings will serve to illustrate the invention.

FIG. 2b is a front view of the mask to be used with the composite filter of FIG. 2a.

FIG. 2c is a front view of the mask of FIG. 2b mounted with the composite filter of FIG. 2a.

FIG. 4b is a front view of a mask for use with the composite filter of FIG. 4a.

FIG. 5 is a front view of a different composite filter.

FIG. 6a is a front view of the composite filter of FIG. 5 in one position in the lamphouse of FIG. 1 and FIG. 6b is a front view of the filter of FIG. 5 in another position in the lamphouse.

Figure 1:
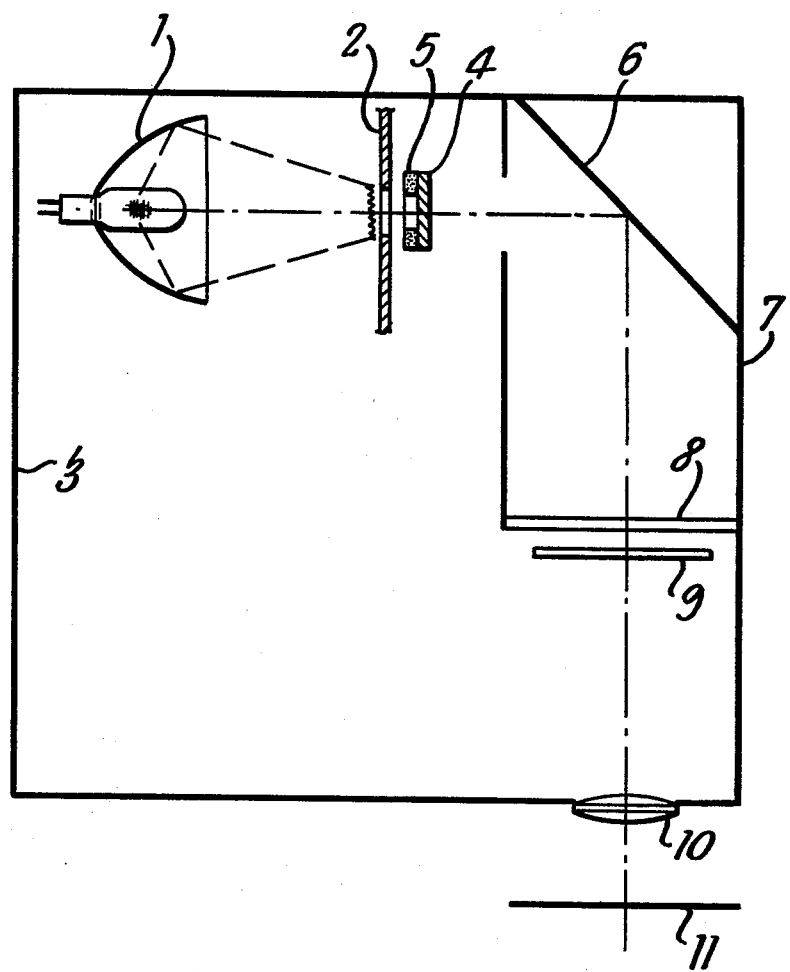
FIG. 1 is a side view of a lamphouse according to the present invention.

In FIG. 1 a tungsten filament lamp of the integral reflector type is mounted so as to prefocus the filament image at an apertured plate 2. Located in the lamphouse 3 on the side of the apertured plate 2 remote from the filament lamp 1 is a composite filter 4 and mounted with the filter 4 is an opaque mask 5.

Light from the lamp 1 is focussed on the apertured plate 2 and then passes therethrough and to the filter 4 which, depending on its position in relation to the plate 2 filters out certain components of the light from lamp 1. The filtered light then passes into a white-lined integrating box 6 and its optical path is turned through 90° and it passes down through a white-lined tunnel 7. It passes out of the tunnel 7 through an opal diffuser 8 and then through a negative 9 and thence via an objective lens 10 to expose print material 11. The print material 11 is variable-contrast material which is more sensitive to green light than to blue light. Also exposure to green light only yields a low contrast print whilst exposure to blue light only yields a high contrast print.

Figure 2A:
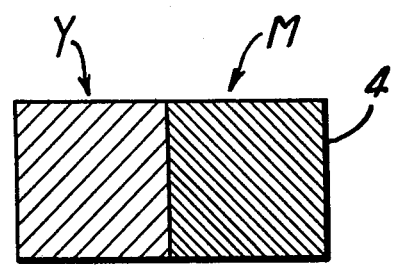
FIG. 2a is a front view of the composite filter used in FIG. 1.

In FIG. 2a the composite filter 4 is shown in front view. The filter 4 is a dichroic glass plate one half of which has a yellow evaporated layer thereon and the other half of which has a magenta evaporated layer thereon. The magenta half is shown by the cross-hatching in one direction on that half of the filter and the yellow by cross-hatching in the other direction.

Figure 2B:
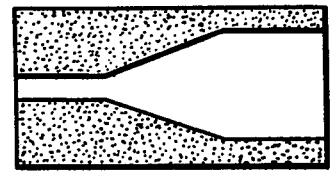
Figure 2C:
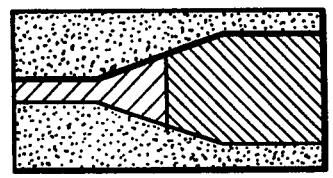

In FIG. 2b a suitable light opaque mask is shown and in FIG. 2c this mask is mounted on the composite filter of FIG. 2a. The areas of cross-hatching indicate the magenta and yellow areas of the filter which are visible through the mask.

Figures 3A, 3B:
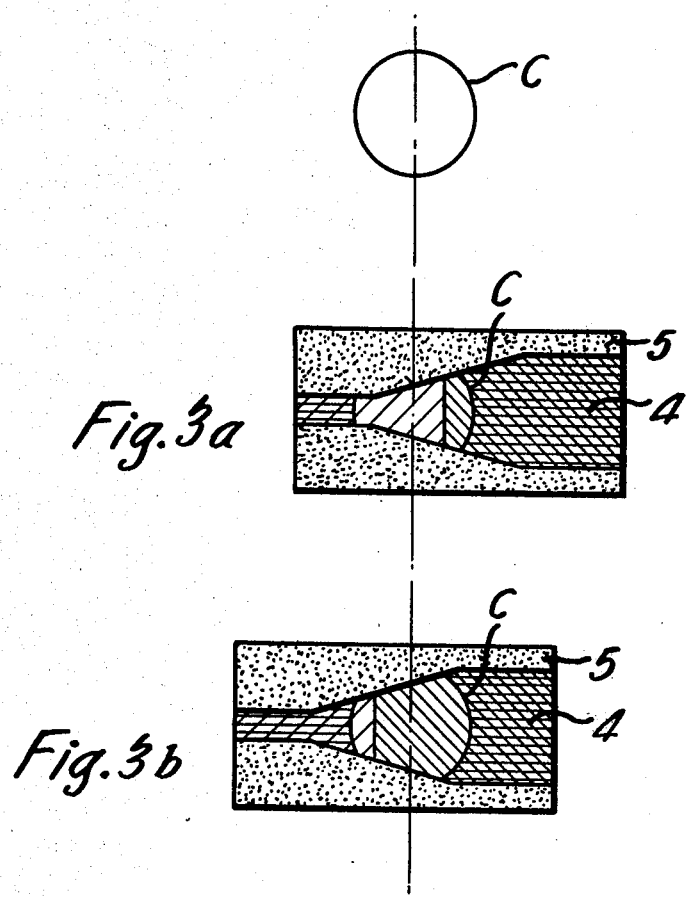
FIG. 3a is a front view of the mask+filter of FIG. 2c in one position in the lamphouse of FIG. 1
FIG. 3b is a front view of the mask+filter of FIG. 2c in another position in the lamphouse.

In FIGS. 3 the hole in the apertured plate is shown as the circle C. In FIGS. 3a and 3b this circle C has been superposed on the mask+filter of FIG. 2c to indicate two positions of the mask+filter on the lamphouse of FIG. 1.

In FIG. 3a most of the light which passes through the circle C passes through the yellow portion of the filter and thus has been attenuated by the mask.

In FIG. 3b most of the light which passes through circle C passes through the magenta portion of the filter and thus the mask cuts out much less light than when the mask+filter was in the position shown in FIG. 3a.

An exposure when the mask+filter is in the position of FIG. 3a would yield a low contrast print as mostly yellow light is employed, whilst an exposure when the mask+filter is in the position of FIG. 3b would yield a much higher contrast print as mostly magenta light is employed.

However the mask has been so shaped that an exposure for an equal duration in either position of FIG. 3a or or FIG. 3b will yield prints of equal visual density although, as just stated, the contrasts of the two prints will differ. Prints of very low contrast will be obtained when circle C covers only the yellow portion of the filter and prints of high contrast will be obtained when the circle C covers only the magenta portion of the filter but for equal duration of exposure times equal density prints will be obtained whatever the position of the mask+filter in relation to circle C.

Figure 4A:
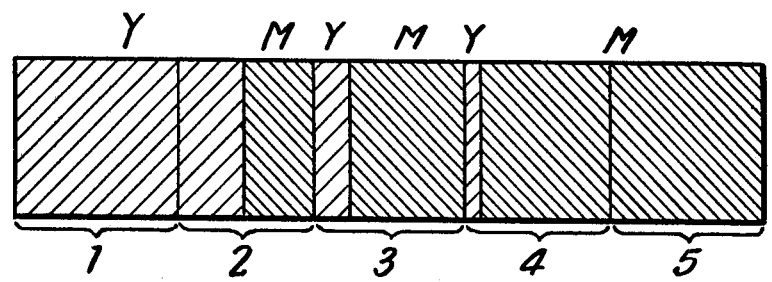
FIG. 4a is a front view of another composite filter.

FIG. 4a shows a composite filter to be used in a step-by-step change in contrast. The filter is divided into five sections. Section 1 is all yellow and section 5 is all magenta and sections 2-4 have differing amounts of yellow and magenta: section 1 being equivalent to grade 0 contrast and section 5 grade 4 contrast.

Figure 4B:
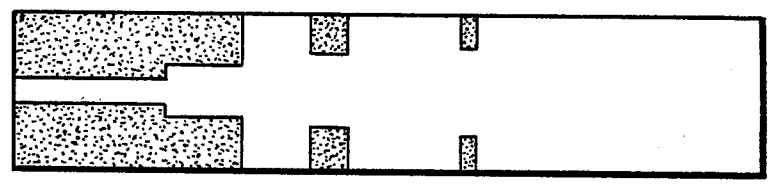

FIG. 4b shows a mask to be mounted with the composite filter of FIG. 4a. By use of this mask the amount of yellow light is reduced in sections 1 to 4 and thus the duration of exposure to produce equal visual densities is the same whichever section is used for the exposure.

In FIG. 5 the composite filter 14 is a dichroic glass plate one half of which has a magenta (M) evaporated layer thereon and the other half of which has a yellow (Y) evaporated layer thereon, there being mounted on the yellow half of the filter a piece of stainless steel mesh which cuts down the amount of yellow light transmitted by the filter to one quarter of the light which would be transmitted if the mesh were removed.

Such a composite filter can be used in the lamphouse of FIG. 1 to replace both the filter 4 and the opaque mask 5.

In FIG. 6 the hole in the apertured plate is shown as the circle C. In FIGS. 6a and 6b this circle C has been superposed on the composite filter of FIG. 5 to indicate two positions of the composite filter 14 in the lamphouse of FIG. 1.

In FIG. 6a most of the light which passes through the circle C passes through the yellow portion of the filter and thus has been attenuated by the steel mesh.

In FIG. 6b most of the light which passes through circle C passes through the magenta portion of the filter.

An exposure when filter 14 is in the position of FIG. 6a would yield a low contrast print as mostly yellow light is employed, whilst an exposure when filter 14 is in the position of FIG. 6b would yield a much higher contrast print as mostly magenta light is employed.

However an exposure for an equal duration in either position of FIG. 6a or FIG. 6b will yield prints of equal visual density although, as just stated, the contrasts of the two prints will differ. Prints of very low contrast will be obtained when circle C covers only the yellow portion of the filter and prints of high contrast will be obtained when the circle C covers only the magenta portion of the filter but for equal duration of exposure times equal density prints will be obtained whatever the position of the filter 14 in relation to circle C.

We claims:

1. A lamphouse for use with an enlarger head in the production of prints on variable contrast material or on conventional photographic material in combination with a monochrome negative which comprises a light source from which light is directed to a fixed apertured plate, there being present a composite filter one portion of which passes light in one of two mutually exclusive wavebands and the other portion of which passes light in the other of the two mutually exclusive wavebands, the said composite filter being movably mounted in relation to the said apertured plate so that in one position the light passing the filter is predominantly in one of the said wavebands, and in a second position the light passing the filter is predominantly in the other of the said wavebands, whilst in intermediate positions a varying mixture of light in the two said wavebands is passed, there being present light attenuating means to cut down the amount of light passed in one of the said two mutually exclusive wavebands to which the combination of light source and photosensitive material to be exposed is more sensitive so that prints of equal visual density are obtained by exposures of an equal duration whatever the position of the said composite filter in relation to the apertured plate.

2. A lamphouse according to claim 1 wherein the means to cut down the amount of light passed in one of the two mutually exclusive wavebands to which the combination of light source and photosensitive material is to be exposed is more sensitive is a shaped mask.

3. A lamphouse according to claim 1 wherein the means to cut down the amount of light passed in one of the two mutually exclusive wavebands to which the combination of light source and photosensitive material to be exposed is more sensitive is a neutral density filter mounted with the one portion of the composite filter which transmits light of the waveband which is required to be attenuated.

4. A lamphouse according to claim 1 wherein the means to cut down the amount of light passed in one of the two mutually exclusive wavebands to which the combination of light source and photosensitive material to be exposed is more sensitive is a dirty filter.

5. A lamphouse according to claim 1 wherein said light attenuating means comprises a shaped mask and a neutral density filter or a dirty filter.

6. A lamphouse according to claim 2 wherein a composite filter is used one portion of which is yellow and the other portion of which is magenta, there being mounted with this composite filter a mask so shaped that in one exposure position of the filter before the apertured plate the full amount of magenta (red and blue) light passes through the aperture, whilst in another position of the filter before the apertured plate a restricted amount of yellow (green and red) light passes through the aperture and at intermediate positions of the filter different proportions of yellow and magenta light pass through the apertured plate but in all of these positions the amount of yellow light is restricted compared with the amount which would be passed if no mask were present, whilst the amount of magenta light passed is substantially the same as if no mask were present.

7. A lamphouse according to claim 2 wherein an elongated composite color filter is used which is divided into five sections which correspond to five contrast grades, and wherein position 1 (which corresponds to grade 0) is all yellow whilst position 5 (which corresponds to grade 4) is all magenta, the three intermediate positions having verying amounts of yellow and magenta to enable the intermediate contrast grades 1, 2 and 3 to be obtained, there being mounted with this filter a mask which masks a portion of the yellow section of sections 1 to 4 of the composite filter.

8. A lamphouse according to claim 3 wherein a composite filter is used one portion of which is yellow and the other portion of which is magenta, there being mounted with the yellow portion of the filter a stainless steel grid which reduces the amount of light passed by the yellow portion of the filter to $\frac{1}{4}$.

9. A lamphouse according to claim 8 wherein the stainless steel grid is a woven wire cloth of nominal 100 mesh standard wire gauze having a wire diameter of 0.1321 mm.

10. A lamphouse according to claim 4 wherein a composite filter is used one portion of which is magenta and one portion of which is yellow, the yellow portion being a dirty filter.

11. A lamphouse according to claim 1 wherein a composite filter is used one portion of which absorbs a band of ultraviolet light but transmits a band of blue light and the other portion of which transmits a band of ultraviolet light but absorbs a band of blue light.

12. A lamphouse according to claim 1 wherein the composite filter is a dichroic filter.

13. A lamphouse according to claim 1 wherein the composite filter used consists of a single piece of glass one end of which carries an evaporated layer which comprises an interference filter which passes light in one mutually exclusive waveband and the other end of which carries an evaporated layer which comprises an interference filter which passes light in the other mutually exclusive waveband.

14. A lamphouse according to claim 1 wherein the composite filter is so mounted in relation to the apertured plate that a manual control alters the position of the composite filter to enable a present contrast grade to be obtained.

* * * * *